United States Patent
Burgess et al.

(10) Patent No.: US 7,283,525 B2
(45) Date of Patent: Oct. 16, 2007

(54) MULTI-PORT NETWORK COMMUNICATION DEVICE WITH SELECTIVE MAC ADDRESS FILTERING

(75) Inventors: Jon J Burgess, Hemel Hempstead (GB); Graeme A Hickman, Harpenden (GB); Shaun Paice, London (GB); Dominic M. R. Ashworth, London (GB); Paul R Garner, Hitchin (GB)

(73) Assignee: 3Com Corporation, Marlborough, MA (US)

( * ) Notice: Subject to any disclaimer, the term of this patent is extended or adjusted under 35 U.S.C. 154(b) by 6 days.

(21) Appl. No.: 09/760,721

(22) Filed: Jan. 17, 2001

(65) Prior Publication Data

US 2001/0012296 A1 Aug. 9, 2001

(30) Foreign Application Priority Data

Jan. 25, 2000 (GB) ............................................ 0001686

(51) Int. Cl.
*H04L 12/56* (2006.01)

(52) U.S. Cl. ....................................... 370/392; 370/401
(58) Field of Classification Search ................ 370/392, 370/401, 402, 404–406, 412, 428–429
See application file for complete search history.

(56) References Cited

U.S. PATENT DOCUMENTS 5,640,393 A     6/1997  Lo et al. ...................... 370/392
6,101,170 A  *  8/2000  Doherty et al. .............. 370/392
6,289,015 B1 *  9/2001  Warner et al. ............... 370/392
6,400,715 B1 *  6/2002  Beaudoin et al. ............ 370/392

FOREIGN PATENT DOCUMENTS

EP          0 431 751         6/1991

* cited by examiner

*Primary Examiner*—Ricky Ngo
*Assistant Examiner*—Richard Chang (57) ABSTRACT

A multi-port network communication device includes a plurality of ports for the reception and transmission of addressed data packets which include media access control address data, a forwarding mechanism for directing packets received at any of said plurality of ports to at least one of the plurality of ports, a memory for the selectively controllable storage of permitted media access control addresses, and means for restricting forwarding of packets from the device in response to an examination of media access control data in said packets and said permitted media access control addresses.

The forwarding of a unicast packet having a source address and a destination address is prevented when neither of those addresses in the unicast packet corresponds to a permitted media access control address. The forwarding mechanism prevents the forwarding of multicast or broadcast packets to ports which are not connected to devices having permitted media access control addresses.

10 Claims, 7 Drawing Sheets

MULTI-PORT NETWORK COMMUNICATION DEVICE WITH SELECTIVE MAC ADDRESS FILTERING

FIELD OF THE INVENTION

This invention relates to multi-port network communication devices, such as for example switches and hubs, which have a plurality of ports for the reception and forwarding of addressed data packets including media access control addresses. The invention is particularly concerned with selectively controllable filtering which facilitates the provision of security against intrusion or misuse of a local area network in which the communication device may be disposed. The invention is applicable though by no means limited to devices which provide, or form part of a local area network which includes, radio links to terminal devices such as personal computers.

BACKGROUND TO THE INVENTION

Packet-based data communication systems are securely established. Packets which are employed for the conveyance of message or control data in such systems normally include at relevant times a header which contains media access control data and protocol or network address data. The former corresponds to 'layer 2' and the latter to 'layer 3' of the conventional OSI model. Protocol data is employed, for example by devices known as routers, to determine the network to which a message packet should be sent and usually also to a device identified by a sub-network address within that destination network.

Media access control addresses are intended for the local control of the forwarding of packets and a packet encapsulated with a media access control address data will contain a source address identifying a device from which the packet has come and except in such cases as for example broadcast packets as discussed later, a destination address identifying the next device for which the packet is intended.

Network communication devices such as switches and hubs necessarily include, whatever their particular architecture may be, some forwarding mechanism by means of which a packet received at one or other of the ports is directed to at least one other port of the device, subject, for example, to possible discard owing to congestion or to rejection owing to data corruption detected by a CRC check. A hub normally provides no selective examination of address data because its main purpose is to ensure that a packet received at one or other of the ports is forwarded from all the other ports of the hub. A hub may include memory for the temporary storage of packets if, for example, the hub needs to perform some contention resolution process which gives some classes of packet priority over other classes of packet.

A switch will normally include a forwarding mechanism which relies on a forwarding database which may be selectively controllable to provide some initial addresses but which is normally built up by an examination of address data in received packets. In particular, a forwarding database may examine received packets for their source MAC address and perform a look-up in the forwarding database for that particular source address. If the source address obtained from the packet is not in the database then the switch will make an entry of that source address in the database and also include such other data, such as the port number, associating the device having that source address with a port of the communication device. The counterpart to this establishment of addresses is the examination of a destination address in a received packet to determine whether that address exists in the database so that a packet having a destination address corresponding to a source address in the database can be directed accordingly, for example to the port associated with the address. Where however the received packet has an unknown destination address it is customary to 'flood' the packet to all ports, in the expectation that the packet will reach the intended destination if that exists anywhere on the network.

A switch may operate either on media access control addresses or network addresses. Where the switch primarily operates on media access control addresses it is frequently termed a bridge and is customarily employed for the connection of two or more local area networks each of which may comprise for example a hub connected to a multiplicity of users. It is known for a bridge to discard a packet of which the destination address is found in the bridge's forwarding database to be associated with the same port at which the packet was received. This feature is employed to ensure that a packet is not unnecessarily returned to its source.

It is known in network communication systems to provide security against unauthorised or undesirable access to a network by means of a 'firewall' which will permit the forwarding of packets only if the protocol or network data within the header of the packet conforms to various rules.

It is known from EP-0431751-A1 (Carter et al) to provide a repeater that corrupts a packet if all or part of a destination address and/or source address do not conform to access rules defined by an address database and it is known from U.S. Pat. No. 5,640,393 (Lo) to scramble packets which do not have a destination address permitted for a particular port.

SUMMARY OF THE INVENTION

The present invention is based on the provision, in a network communication device of the kind generally described above, of a list or table, constituted by a suitable selectively controllable memory or part thereof, containing entries constituting permissible media access control addresses, there being means for restricting forwarding of packets from the device in response to an examination of media access control data in a packet and the permitted media access control addresses.

Such a selectively controllable address table may take the form of a common control table for a multiplicity of ports of the device but may be provided in respect of a particular port or for each of a plurality of ports of the device. The table may be of the same general character as a forwarding, database, relating media access control addresses to port numbers of the device but as will be seen, performs a different function, that of selective filtering of packets.

According to one aspect of the invention the forwarding of a data packet is prevented unless a media access control address in the packet matches an address in the table. More particularly the forwarding of a packet may be prevented unless either the specific source address or the specific destination address in the packet matches a permitted media access control address in the table. This aspect of the invention may be used to inhibit the sending or reception of messages by an intruder (using a device of which the media access control address is not represented in the table) except to specified devices in the network.

Another aspect of the invention concerns particularly but not exclusively the control of the sending of multicast or broadcast packets where for example the source of those packets is not represented in the list or table of permitted media access control addresses. The list may be employed to produce a port mask or the equivalent which restricts the forwarding of such packets from ports which are not associated with media access control addresses in the table. Thus for example a packet may be forwarded only to a port which is both a port to which the packet may be forwarded according to the forwarding rule relating to the destination address data (including a general address characteristic of a broadcast packet) and is a port connected to an address in the selectively controllable memory.

The memory may be a persistent or non-volatile memory such as a flash memory but in the broad aspect of the invention need not be.

One advantage of the invention is that it may be used to prevent communication between two users on the same local area network.

DESCRIPTION OF PREFERRED EXAMPLES

As indicated previously, the invention may be embodied in a multi-port network communication device such as a switch or hub. An important feature of the invention is a table of media access control addresses, i.e. layer 2 addresses, which may be disposed in a table or database which may be constituted by persistent or non-volatile storage memory. The permissive table may be provided as a single central address table with information on all the relevant MAC addresses and their associated port but may be constituted by a respective table for each of a multiplicity of ports.

Figure 1:
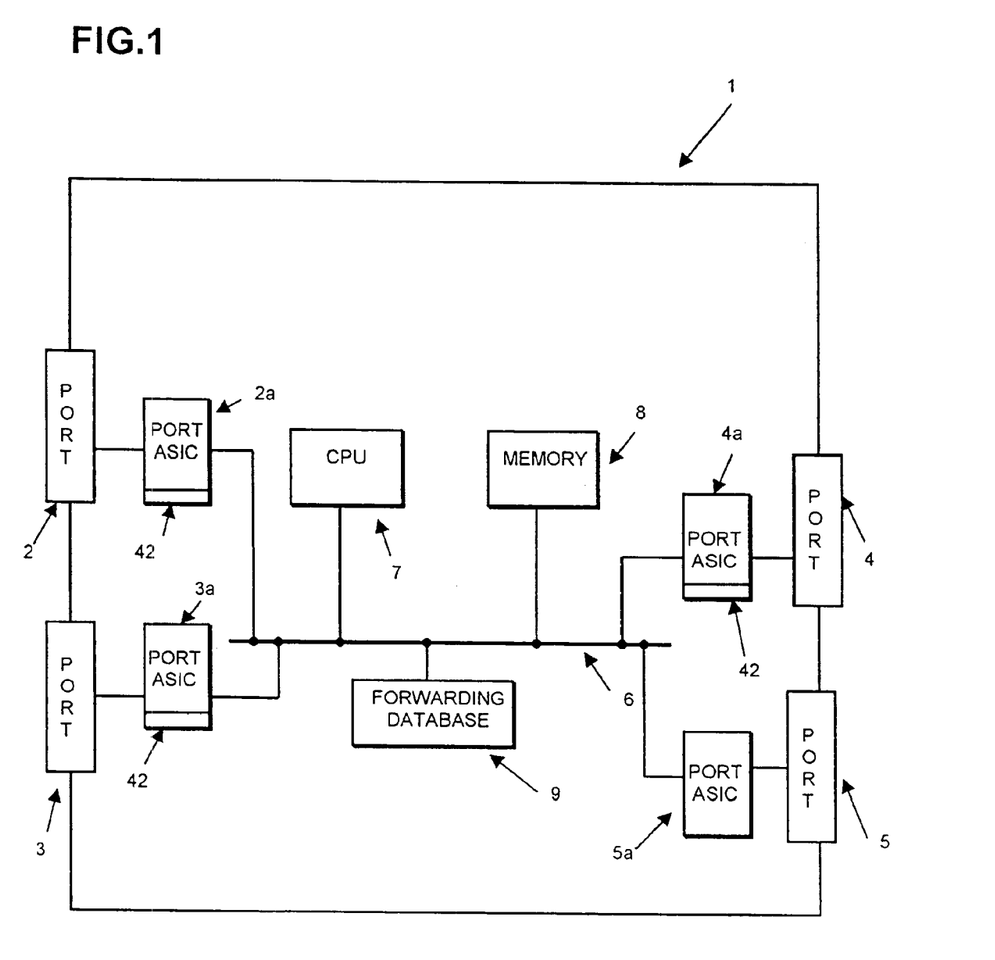
FIG. 1 illustrates a multi-port network switch which schematically illustrates the provision of address tables in accordance with the invention.

FIG. 1 illustrates a version which has a security table for each of several ports and will be described in connection with FIGS. 2, 4 and 5.

FIG. 1 for the most part illustrates a switch in generally known form, with the exception of security blocks 42 to be described. For the rest, the switch is illustrated in conventional terms. The invention is applicable to a wide variety of switch architectures and the description of FIG. 1 that follows is deliberately in a simplified schematic form.

In FIG. 1, the switch 1 has a plurality of ports 2, 3 and 4 (many fewer than would normally be provided) which can receive or transmit addressed data packets. The ports may be capable of either half-duplex or full-duplex working or both.

The switch 1 includes an additional port 5 which is generally similar to the other ports but in this embodiment of the invention is a designated 'management' port which is protected by a password and is intended to receive management or control packets or frames which may be employed in a well known manner to configure the switch for a particular desired mode of operation or may be used for the insertion of initial data in storage devices of the switch or may be used to embed software within it, all in accordance with known techniques.

Each of the ports has a port ASIC, 2a to 5a respectively. These will comprise a physical layer device (PHY) and a media access controller MAC (such as shown for example in FIG. 4). These devices translate the signal from the particular transmission medium, for example twisted-pair or optical fibre, into a media independent format and perform basic operations on received packets. In accordance with known practice the port ASICs may include FIFOs for the temporary storage of packets as they are received or before they are transmitted or while various control and switching operations are performed by the switch before the packets are put in any central memory space.

The switch in FIG. 1 includes an internal bus system 6, which may convey both data in the form of packets and also control and status information to and from the various components of the switch. Coupled to the bus system 6 are processing resources constituted by a CPU 7, a central memory 8 and a forwarding database 9. The memory 8 may be employed for the storage of packets in buffers or dynamic FIFOs, which may be organised to provide transmit queues of data packets before they are forwarded. The memory space 8 may also store programs that are to be executed by the CPU 7.

Figure 3:
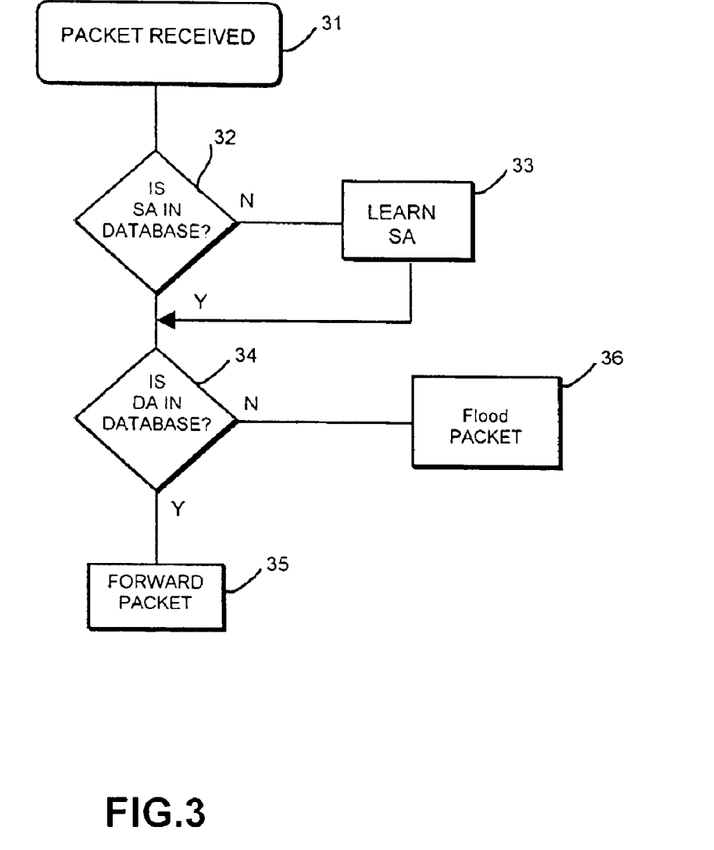
FIG. 3 illustrates in simplified form learning rules for a known form of forwarding database.

The forwarding database 9, as is customary for switches, will contain a table that may be established and used as described for completeness with reference to FIG. 3. In essence it will store entries of addresses with associated physical information (such as the number of a port) to enable a forwarding engine in the CPU to retrieve packets stored in memory 8 and to direct them to the ports in accordance with the entries in the forwarding database. Alternatively the forwarding engine may be implemented in hardware.

As previously noted, in this example the port ASICs include security blocks 42 for each of the ports ASICs 2a to 4a These will be described with reference to FIGS. 4 and 5.

Figure 2:
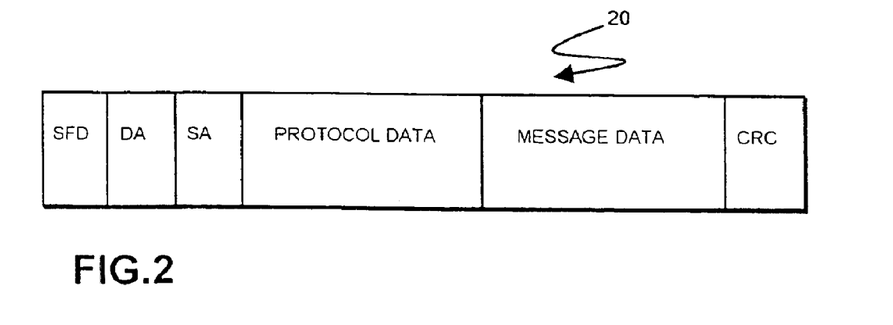
FIG. 2 illustrates an addressed data packet.

FIG. 2 of the drawings illustrates a typical addressed data packet 20 which may be employed by a communication device in accordance with the invention. It includes a start of frame delimiter (SFD), a destination address (DA), a source address (SA), and protocol data which may include a network address and other data not relevant to the present invention. The packet as thus far described is constituted by a header portion. The remaining parts of the packet 20 are the message data (or other data if the packet is a control packet rather than a message packet) and check sum or cyclic redundancy code data (CRC) at the end.

For the sake of completeness and also comparison, FIG. 3 illustrates in a simplified manner how a forwarding database such as the database 9 is built up. In the somewhat simplified scheme shown in FIG. 3, a packet is received (stage 31). The packet is examined (stage 32) to determine whether the source address SA is in the forwarding database 9. If the source address is not in the database, the address is 'learned', stage 33. By this is meant there is created an entry in the database which can be accessed using the stored source address and contains other data, such as for example the port number of the port on which the packet was received.

The other look-up which is performed is to determine whether the destination address of the packet is in the database, stage 34. If the destination address is in the database, the matching of the destination address of the packet with the stored data address will 'return' the associated data, and that will enable the packet to be forwarded from the switch (stage 35) to the port identified in the database. If the destination address is not in the database, then normally (stage 36) the packet must be 'flooded,' that is to say sent to all the possible destinations to which the switch can send packets. In the present simplified example the packet would be flooded from all the ports 2, 3 and 4. If a response to this packet is later received from the unknown destination then its address will be learned and thereby become a known destination.

FIG. 3 illustrates the normal operation of a forwarding database. In general, the process may be employed both for layer 2 and layer 3 databases. Moreover, there exists quite a wide variety of forwarding databases that employ different methods of look-up. For example, hashing of addresses may be used in conjunction with pointers linking a chain of similarly hashed addresses in the database in order to make the look-up process quicker.

Before a specific example of the invention is described with reference to FIG. 1 and FIGS. 4 and 5, it is convenient to mention that a hub will essentially differ from a switch in that there need be no forwarding database, the purpose of a hub being to forward a packet received on any port indiscriminately from at least all the other ports and possibly also the port on which the packet was received, without any discrimination on the basis of addresses. Thus a typical hub will not include a forwarding database 9 as described with reference to FIG. 1. It may include all the other components including the memory 8, since it may be necessary to store packets temporarily while some contention resolution is performed. A hub will include a forwarding engine which will enable packets received by the ports to be stored in memory, then retrieved from memory and then directed to the output ports.

Figure 4:
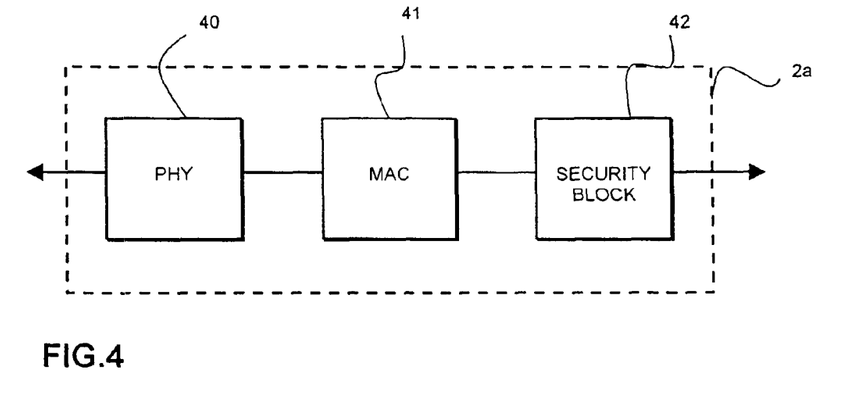
FIG. 4 illustrates the disposition of a security block in respect of a given port of a communication device.

FIG. 4 illustrates the typical disposition of an 'intrusion security block' according to the invention in a port ASIC such as the ASIC 2a. The ASIC normally comprises a PHY 40 and a MAC 41. A security block 42 may be interposed between the MAC and the bus system by means of which packets encapsulated or decapsulated by the MAC will travel between the MAC and, for example, the central memory 8.

Figure 5:
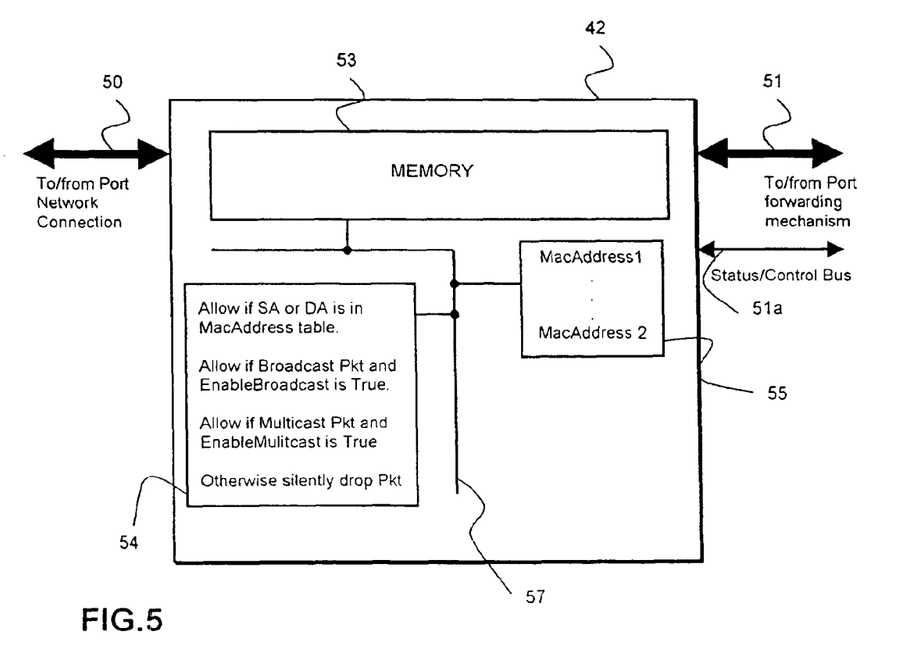
FIG. 5 illustrates one example of a security block including an address table in accordance with the invention.

FIG. 5 illustrates an intrusion security block 42 in greater detail.

In essence, this block 42 provides for the respective port an address table with information on the entire set of allowed MAC addresses for the device. The examination of the source address (SA) and destination (DA) fields of a packet and the look-up of the address in the address table to find a possible match can be used to distinguish between valid and 'invalid' traffic. The basis of the security block is that for each packet which has a source address and a destination address, the packet will be discarded, preferably 'silently' (without any indication to the sender) if neither the source address nor the destination address is already in the control table.

In a practical system, packets received by the switch will be of a variety of types, including unicast, multicast and broadcast packets. The media access control addresses of packets going through the port can be classified in three ways. They may be (i) 'unicast not allowed', (ii) 'unicast allowed' and (iii) multicast or broadcast. Although the invention is not limited to be in conformity with any particular standard, a specific version of the invention preferably (in accordance with IEEE Standard 802.3-1998) employs packets (i.e. frames) which contain two address fields the destination address field (DA) and the source address field (SA). Each address field can one of two types, an individual address, i.e. an address associated with a particular station on the network, or a group address, which is a multidestination address, associated with one or more stations on a given network.

There are two kinds of multicast address, a multicast-group address, i.e an address associated by higher-level convention with a group of logically related stations; and a broadcast address, which is a distinctive, predefined multicast address that always denotes the set of all stations on a given LAN. In the current Standard, all 1's in the destination address field is predefined to be the broadcast address.

The different types of packet are illustrated in Table 1 below. In this table, a small x denotes a value of a bit, whereas a double capital X denotes the value of a byte. Multicast and broadcast packets are distinguished from unicast packets by the I/G bit, ('0' for unicast and '1' for multicast and broadcast).

TABLE 1

| MAC address | Address type |
|---|---|
| 0xxxxxxx:XX:XX:XX:XX:XX | Unicast |
| 1xxxxxxx:XX:XX:XX:XX:XX | Multicast |
| 11111111:FF:FF:FF:FF:FF | Broadcast (all 1's) |

The system can not be broken by an intruder making a multicast transmission because the mechanism ensures that such transmissions originating from a device which is not on the allowed list are only forwarded to the devices which are on the allowed list, by ensuring the message is only sent out of those ports with allowed devices connected. Note, the packet may be received by a device not on the allowed list if it is connected by means of a hub to the same port as that of an allowed device. This may be prevented by ensuring that all allowed devices are directly connected to a port of a device employing intrusion security.

The operation of the invention does not require addresses to be learned in the manner described with reference to FIG. 2. All that is required is to determine whether the source and destination addresses are unicast, broadcast or multicast and whether they exist in the table or not.

Table 2 set out below indicates the forwarding rules which are employed by the security block 42.

TABLE 2

| | | DA Uni. not allowed | Uni. Allowed | Broadcast or multicast |
|---|---|---|---|---|
| SA | Uni. not allowed | (1) Blocked | (2) Allowed | (3) Special |
| | Uni. Allowed | (4) Allowed | (5) Allowed | (6) Allowed |
| | Broadcast or multicast | N/A | N/A | N/A |

In accordance with the invention, if neither the destination address nor the source address are stored in the special address table, case (1) the packet is 'blocked' (i.e. discarded) since the transmission is a communication between two devices of which neither has an allowed address.

If however either the destination address or the source address is in the allowed address table, the transmission is allowed, cases (2) and (4)–(6).

A special case (3) exists where the source address is not in the allowed table but the transmission is a 'broadcast or multicast' transmission. This may be treated as a special transmission in which transmission is allowed to be sent out of ports with any allowed address.

This special (3) case is implemented as follows:

On reception of a packet (i.e. a packet progressing from connection 50 towards connection 51) classified as (3) the packet is passed to the switch. On transmitting the packet (passing from connection 51 to connection 50) then if the SA is in the allowed list the packet is passed. If the SA is not in the allowed list then if this port has any allowed addresses in the list then it will send out the packet. Otherwise the packet is discarded. In this way a multicast or broadcast packets from allowed addresses are passed to all ports, whereas multicasts or broadcasts from non-allowed devices are only passed out of ports which are connected to allowed devices. This prevents the packets from reaching other non-allowed devices.

It is not legal for a packet to contain either a multicast or broadcast address for the source address of the packet, and hence the relevant entries in Table 2 are n/a (not applicable).

FIG. 5 illustrates the security block 42 in greater detail. The block has a connection 50 to the associated port and particularly to the MAC 41 and a connection 51 to or from the forwarding mechanism. Packets are temporarily stored in memory 53. The security block includes a security table 55, an enable block 56 and a central block 54 operating substantially in accordance with Table 2.

The connections 51 and 51a are a data bus and a status/control bus forming part of the bus system 6. The table 55 is constituted by a persistent memory device into which MAC addresses can be written by way of signals over the buses 51, 51a from the management port. The control block 54 controls look-ups in the table 55 for the source and destination MAC address of a packet temporarily held in memory 53, and allows forwarding of the packet (on connection 50 or 51 as appropriate) if (i) either the source address (SA) or the destination address is a valid address in the table 55, or (ii) if the packet is a multicast or broadcast packet and the fits the forwarding rule for these packets. Otherwise control block 54 causes discard of the packet without any indication to the source that discard has occurred.

Figure 6:
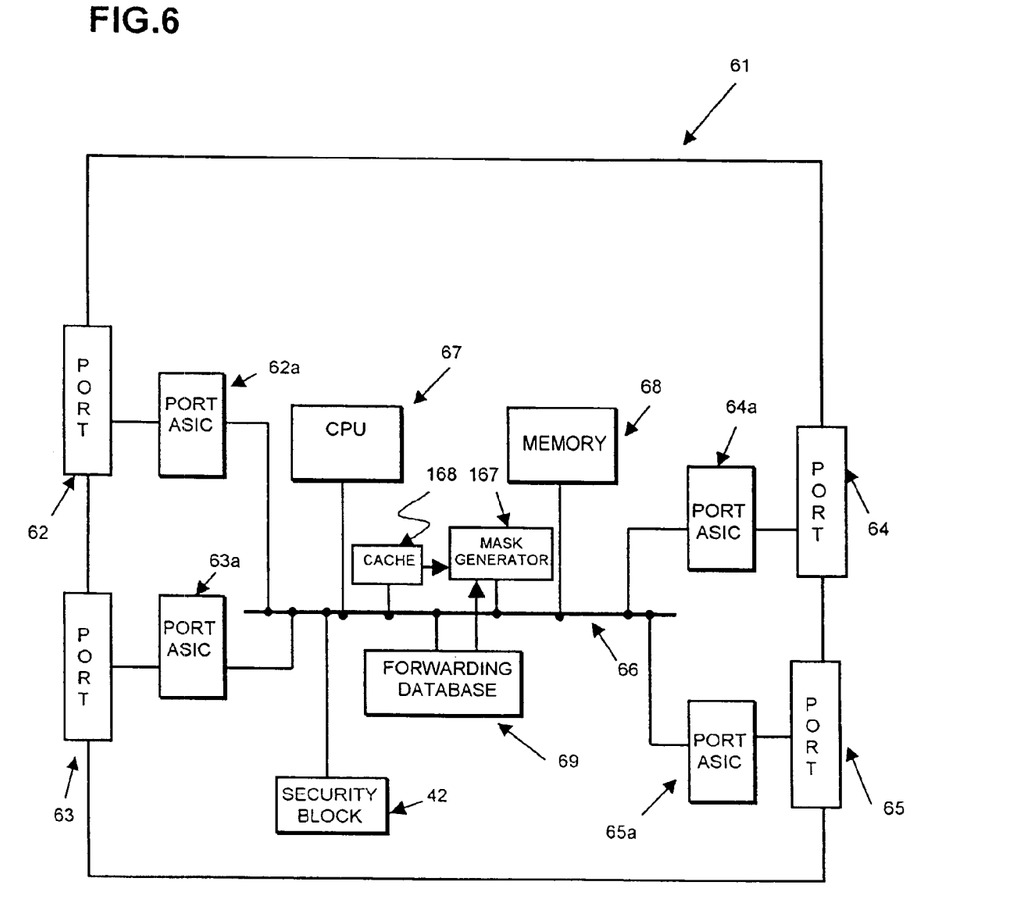
FIG. 6 illustrates another form of switch in accordance with the invention.

FIG. 6 illustrates a modified version of the switch shown in FIG. 1. In essence the difference between this switch 61 and the switch 1 is that the security block 42 has been shifted to be centralised instead of being on a port for port basis. Otherwise the switch resembles that in FIG. 1, having ports 62–65, a bus system 66, a CPU 67 and main memory 68.

As before, the security block 42 must include a MAC address table such as the table 55 enabling the storage in persistent storage of a list permitted MAC addresses. However, the function of memory 53 may now be performed by the main memory 8. The functions of the control block 54 and the enable block may be built into the forwarding engine stored in memory 8 and executed by CPU 7.

The different address classes are shown below. An examination of the bits within the address and a look-up of the address in the address table block 42 enables two determinations, (i) whether a source or destination address in the packet is in the allowed table; and (ii) whether the packet is unicast, multicast or broadcast. An allowed address is one that has been configured to be allowed by intrusion security.

There will be three types of address, particularly 'allowed unicast', 'not allowed unicast', 'multicast and broadcast'.

The forwarding rules may follow Table 3 as indicated below. However, there will be a more general function, since there will be three outcomes for applying intrusion security to a packet. The packet may be allowed for all ports, blocked to all ports or allowed to a list of ports. A port mask may be computed (as described below) by means 58 and returned to the switch packet forwarding engine.

TABLE 3

|    |               | DA Uni. not allowed | Uni. Allowed | Broadcast   |
|----|---------------|---------------------|--------------|-------------|
| SA | Uni. not allowed | (1) Blocked      | (2) Allowed  | (3) Special |
|    | Uni. Allowed  | (4) Allowed         | (5) Allowed  | (6) Allowed |
|    | Broadcast     | N/A                 | N/A          | N/A         |

The forwarding database contains a mapping of which MAC addresses have been seen as source addresses on each port. A look-up facility is also provided which operates in response to a MAC address and constitutes a search of the entries within the database. The look-up function will return the port number with which the address is known to be associated, otherwise it will be determined that there is no such port, and the address is therefore 'unknown'. The purpose of the port number is to allow the calculation of the special case where the packet needs to be sent to ports on the allowed list. In the example shown in Table 4 below this would be ports 1 and 2.

TABLE 4

| MAC Address            | Port Number (found by look-up) |
|------------------------|--------------------------------|
| Server1 08:11:11:11:11:11 | 1                           |
| Server2 08:22:22:22:22:22 | 2                           |

FIG. 6 illustrates two blocks 167 and 168 denoted 'mask generator' and 'cache' respectively. These blocks are shown separately for ease of explanation but may be subsumed in the CPU 67 (or the corresponding hardware) and the memory 68. These functional blocks are employed to produce a 'combined' list of ports from which a packet can be forwarded. All the allowed addresses are looked up within the forwarding database 69. A list of all the ports which are connected to allowed devices is made and this list is used to produce a list of destination ports for the forward transmission of packets from 'non-allowed' devices. This can be readily implemented as follows. When a unit within the switch needs to indicate that a packet may be forwarded from more than one port it is customary to provide the packet with a port mask, typically containing 32 bits each of which is a 'flag' denoting a respective port. Thus bit 0 may represent port 1, bit 1=port 2 and so on. A look-up of the list of allowed addresses and the ports associated with them provides a list of allowed ports (an 'allowed' port mask) which can be combined in mask generator 167 (e.g. using an AND function on the two lists) with the 'normal' port mask to produce a 'combined port mask' which allows transmission only to the port or ports which are permitted by both the forwarding rule for the packet and the list of allowed ports. If for example for a given packet the switch would (in the absence of the 'allowed list') send a packet only to port 4 but all ports were allowed (or vice versa) the packet will be sent only to port 4. If only port 4 were on the 'normal' port mask and only port 5 on the 'allowed' port mask the packet would be discarded. For a broadcast packet or multicast packet the switch would normally send the packet to all or a selected multiplicity of ports and the effect of combining the list of such ports with the allowed list would be to reduce the number of ports from which the packet may be forwarded.

The list of allowed ports may be 'cached' i.e stored in cache 168 to reduce the number of look-ups required for the forwarding database. It may be need to be updated whenever a MAC address change occurs in the database. Since the allowed list of addresses would normally be configured infrequently the caching of the list of allowed ports is normally more efficient than having to perform a lookup of all the allowed addresses in the address table for every multicast/broadcast packet. The list may only need chance in a few circumstances, e.g. when an allowed address moves from one port to another.

A further optional modification would be to fix the port of the allowed address, to enhance security further, since this would stop an attacker 'forging' the address of a device on a different port. Such a modification facilitates the maintenance of the allowed list.

Figure 7:
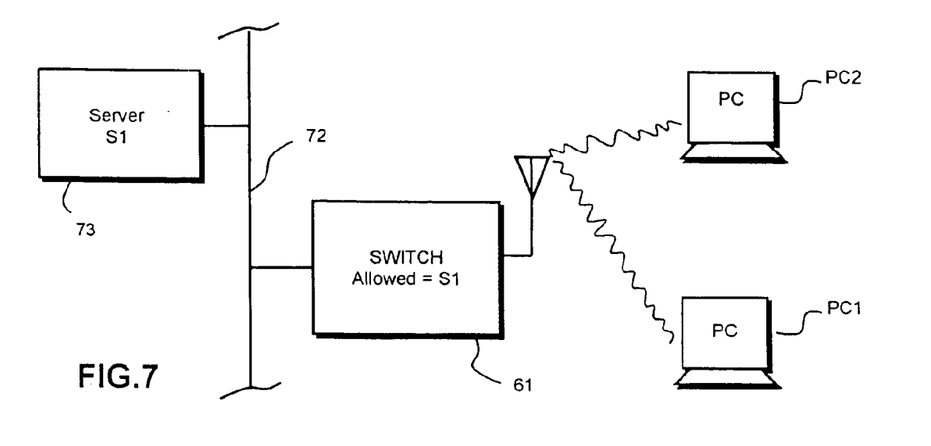
FIG. 7 illustrates part of a local area network including a device according to the invention.

FIG. 7 illustrates one example of the invention employed in a network.

In the example shown in FIG. 7, numeral 61 denotes a switch of the kind described with reference to FIG. 6, though the switch may be a switch 1 as described with reference to FIGS. 1, 4 and 5. In this example at least one of the ports has a transceiver (denoted by an antenna 71) which may communication with 'clients' represented by personal computers PC1 and PC2. The switch 61 is connected by way of a bus 72 to a server 73 and possibly to other stations on a local area network. Any traffic from PC1 must go via switch 61, if direct communication from PC1 to PC2 is possible then intrusion security will not protect the devices from one another.

In the example shown, the switch 61 has in its security block 42 an 'allowed' MAC address only for the server S1. In this example, either of the personal computers may communicate with the server S1 but may not by way of the switch 61 send communications to each other. Thus FIG. 7 provides isolation between 'clients' on a single radio link.

Figure 8:
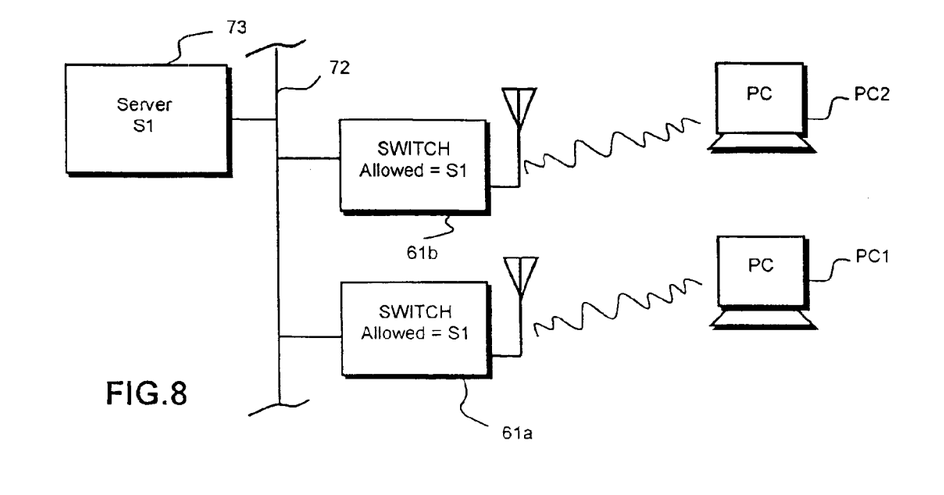
FIG. 8 illustrates part of another local area network including a switch in accordance with the invention.

FIG. 8 shows a modification in which there are two switches 61a and 61b each providing radio communication with a respective one of the personal computers PC1 and PC2. In this configuration, the switches are each configured so that they have only the MAC address (S1) of the server in the table 55. Thus PC1 and PC2 may communicate only with the server. Moreover, a 'hacker' or other person connected to the local area network will not be able to attack PC1 or PC2 because the relevant switch will drop his packets. Neither this MAC address nor that of PC1 or PC2 is in the table allowed addresses.

Figure 9:
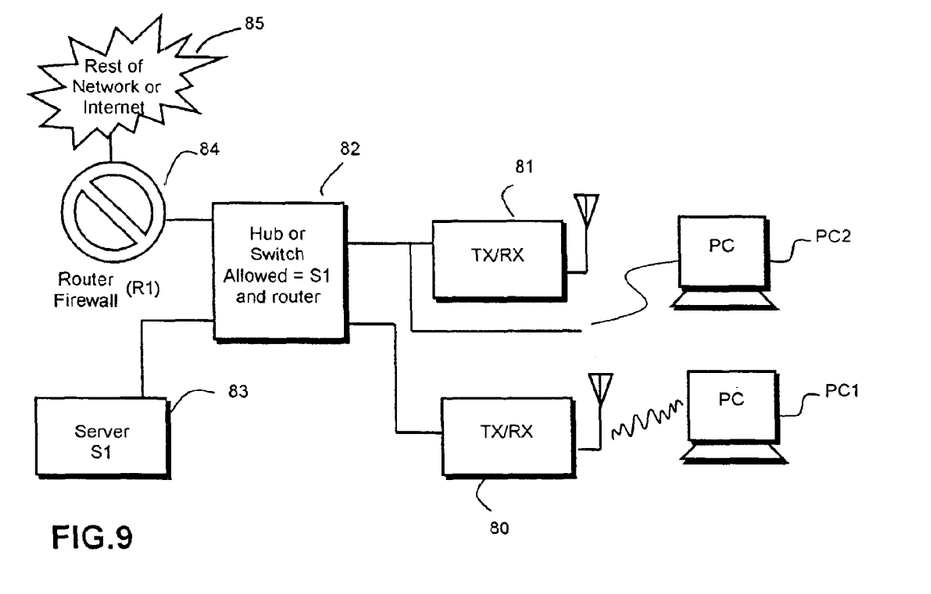
FIG. 9 illustrates part of a yet further local area network including a switch according to the invention.

FIG. 9 illustrates a more complex system in which a first PC1 is connected by a radio link to a transceiver 80 connected to a hub or switch 82 which has a permissive table allowing, only two MAC addresses, the address S1 of a server 83 and the address R1 of a router firewall 84. The router is connected to the rest of the network or the Internet 85. A second PC (PC2) is connected to an Ethernet port 86 provided in addition to a transceiver 81.

Such an arrangement may be useful, for example, in a hotel which has a dedicated radio transceiver and an Ethernet port in every room. Since the clients, represented by personal computers PC1 and PC2, can obtain direct access to the Ethernet network, the security mechanisms need to be separated. The hub or switch containing the allowed addresses will achieve this object. It would also be of benefit if the security mechanism were built into 80 and 81 since this would provide security between multiple users of the same wireless access point.

Figure 10:
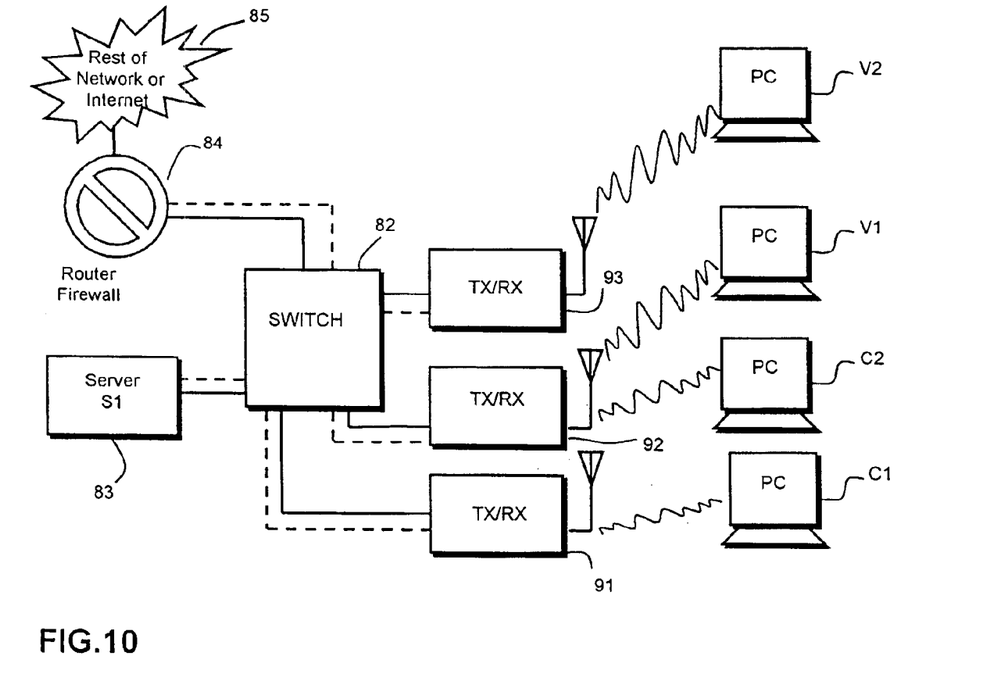
FIG. 10 illustrates part of a yet further local area network including a switch in accordance with the invention.

FIG. 10 illustrates a yet more complex system having transceivers 91, 92 and 93 which may communicate with any of four personal computers. It will be assumed that personal computers V1 and V2 are 'visitors' whereas personal computers C1 and C2 are controlled by employees. Otherwise the system is similar to that shown in FIG. 9.

The corporate network described may use virtual local area networks to allow access to either an employee network, conveniently described as 'blue' VLAN or a visitors/public network, a 'red' VLAN. Devices wishing to employ the transceivers will be challenged for user identification and authorisation which may be in the form of a name and password. In the example above all devices will be allowed to access server 83. Either the switch 82 or a router/firewall will prevent packets on the red VLAN from accessing the private corporate network. The router/firewall 84 can be configured to allow employees on the private VLAN to connect to devices on the visitors VLAN but block connection request in the opposite direction. This is a known use of firewalls.

Standard VLAN security would prevent visitors V1 and V2 from communicating with the employees' computers C1 and C2. However, VLANs do not prevent the visitors from attacking one another. A known way of implementing this securely with VLANs is to allocate one VLAN per port. However, with the present invention intrusion security may be used to prevent visitors V1 and V2 and other devices on the visitors VLAN from communicating directly. Visitors can be allowed access by means of the security table of allowed MAC addresses only to the server S1 and the router. It is assumed that the router or firewall would be configured to allow access only to a limited number of services.

What is claimed is:

1. A multi-port network communication device including:
    a plurality of ports for the reception and transmission of addressed data packets which include media access control address data;
    a forwarding mechanism for directing packets received at any of said plurality of ports to at least one of the plurality of ports;
    a memory for the selectively controllable storage of permitted individual media access control addresses; and
    means for restricting forwarding of packets from the device in response to an examination of media access control data in said packets and said permitted media access control addresses;
    wherein said means for restricting prevents the forwarding of a unicast packet having a source address and a destination address when neither of those addresses in the unicast packet corresponds to a permitted media access control address, said device including means for comparing both the source address and the destination address of said unicast packet with said permitted individual media access control addresses.

2. A device according to claim 1 wherein said means for restricting prevents the forwarding of multicast and/or broadcast packets to ports which are not connected to devices having permitted media access control addresses,
    said device being operative to provide a list of ports which are connected to devices having permitted media access control addresses and said forwarding mechanism including a port mask generator for producing a port mask that identifies a port which is both a port to which a packet may be forwarded according to media access control data in the packet and a port in said list.

3. A multi-port network switch including:
a plurality of ports for the reception and transmission of addressed data packets which include media access control source and destination address data;
a forwarding database relating media access control addresses to said ports;
a forwarding mechanism for directing, in response to media access control destination address data in a received packet and in cooperation with said forwarding database, said received packet to at least one of the plurality of ports;
a memory for the selectively controllable storage of permitted individual media access control addresses; and
means for restricting forwarding of packets from the device in response to an examination of media access control data in said packets and said permitted individual media access control addresses;
wherein said means for restricting prevents the forwarding of said received packet when said packet is a received unicast packet having a source address and a destination address when neither of those addresses in the received unicast packet corresponds to a permitted media access control address, said switch including means for comparing both the source address and the destination address of said received unicast packet with said permitted individual media access control addresses.

4. A switch according to claim 3 wherein said means for restricting prevents the forwarding of multicast and/or broadcast packets to ports which are not connected to devices having permitted media access control addresses, said switch including:
a cache containing a list of ports which are connected to devices having permitted media access control addresses; and
a port mask generator for producing a port mask that identifies a port which is both a port to which a packet may be forwarded according to media access control data in the packet and a port in said list.

5. A multi-port network switch including:
a plurality of ports for the reception and transmission of addressed data packets which include media access control source and destination address data;
a forwarding database relating media access control addresses to said ports;
a forwarding mechanism for directing, in response to media access control destination address data in a received packet and in cooperation with said forwarding database, said received packet to at least one of the plurality of ports;
a memory for the selectively controllable storage of permitted individual media access control addresses; and
means for restricting forwarding of packets from the device in response to an examination of media access control data in said packets and said permitted individual media access control addresses;
wherein said means for restricting
(a) prevents the forwarding of said received packet when said packet is a received unicast packet having a source address and a destination address when neither of those addresses in the received unicast packet corresponds to a permitted individual media access control address, said switch including means for comparing both the source address and the destination address of said received unicast packet with said permitted individual media access control addresses; and
(b) prevents the forwarding of a multicast and/or a broadcast packet to ports which are not connected to devices having permitted individual media access control addresses stored in said memory.

6. A method for providing multi-port network communication using a plurality of ports for the reception and transmission of addressed data packets which include media access control address data, said method comprising:
directing packets received at any of said plurality of ports to at least one of the plurality of ports;
selectively controlling storage of permitted individual media access control addresses;
restricting forwarding of packets in response to an examination of media access control data in said packets and said permitted media access control addresses; and
preventing forwarding of a unicast packet having a source address and a destination address when neither of those addresses in the unicast packet corresponds to a permitted media access control address based on comparison of both the source address and the destination address of said unicast packet with said permitted individual media access control addresses.

7. A method as in claim 6 wherein said restricting step prevents the forwarding of multicast and/or broadcast packets to ports which are not connected to devices having permitted media access control addresses, and further comprising:
providing a list of ports which are connected to devices having permitted media access control addresses and producing a port mask that identifies a port which is both a port to which a packet may be forwarded according to media access control data in the packet and a port in said list.

8. A method for switching a multi-port network including a plurality of ports for the reception and transmission of addressed data packets which include media access control source and destination address data, said method comprising:
maintaining a forwarding database relating media access control addresses to said ports;
directing, in response to media access control destination address data in a received packet and in cooperation with said forwarding database, said received packet to at least one of the plurality of ports;
selectively controlling storage of permitted individual media access control addresses;
restricting the forwarding of packets in response to an examination of media access control data in said packets and said permitted individual media access control addresses;
preventing the forwarding of said received packet when said packet is a received unicast packet having a source address and a destination address when neither of those addresses in the received unicast packet corresponds to a permitted media access control address based on comparing both the source address and the destination address of said received unicast packet with said permitted individual media access control addresses.

9. A method as in claim 8 wherein said restricting prevents the forwarding of multicast and/or broadcast packets to ports which are not connected to devices having permitted media access control addresses, and further comprising:

maintaining a cache containing a list of ports which are connected to devices having permitted media access control addresses; and     producing a port mask that identifies a port which is both a port to which a packet may be forwarded according to media access control data in the packet and a port in said list.

10. A method for switching a multi-port network including a plurality of ports for the reception and transmission of addressed data packets which include media access control source and destination address data, said method comprising:

maintaining a forwarding database relating media access control addresses to said ports;

directing, in response to media access control destination address data in a received packet and in cooperation with said forwarding database, said received packet to at least one of the plurality of ports;

selectively controlling storage of permitted individual media access control addresses;

restricting forwarding of packets from the device in response to an examination of media access control data in said packets and said permitted individual media access control addresses wherein:

(a) the forwarding of said received packet is prevented when said packet is a received unicast packet having a source address and a destination address when neither of those addresses in the received unicast packet corresponds to a permitted individual media access control address based on comparing both the source address and the destination address of said received unicast packet with said permitted individual media access control addresses; and     (b) preventing the forwarding of a multicast and/or a broadcast packet to ports which are not connected to devices having stored permitted individual media access control addresses.

* * * * *